(12) United States Patent
Muth et al.

(10) Patent No.: US 6,260,726 B1
(45) Date of Patent: Jul. 17, 2001

(54) OVER/UNDERPRESSURE VALVE FOR A FILLER NECK CAP ASSEMBLY

(75) Inventors: Manfred Karl Joachim Muth, Plettenberg (DE); Sandor Palvölgyi, Gleisdorf (AT)

(73) Assignee: Tesma Motoren- und Getriebetechnik Ges.mbH, Preding-Krottendorf (AT)

(*) Notice: Subject to any disclaimer, the term of this patent is extended or adjusted under 35 U.S.C. 154(b) by 0 days.

(21) Appl. No.: 09/091,702
(22) PCT Filed: Jan. 9, 1997
(86) PCT No.: PCT/AT97/00002
  § 371 Date: Jun. 23, 1998
  § 102(e) Date: Jun. 23, 1998
(87) PCT Pub. No.: WO97/27123
  PCT Pub. Date: Jul. 31, 1997

(30) Foreign Application Priority Data

Jan. 9, 1996 (AT) ............................ A35/96

(51) Int. Cl.⁷ ............................ B65D 51/16; B65D 53/02
(52) U.S. Cl. ............................ 220/203.24; 220/203.26; 220/203.28; 220/86.2; 220/DIG. 33
(58) Field of Search ............................ 220/203.24, 203.01, 220/582, 202, 203.1, 203.23, 203.26, 203.28, 203.29, 86.2, DIG. 33, 203.02, 203.11, 203.27

(56) References Cited

U.S. PATENT DOCUMENTS

| | | | |
|---|---|---|---|
| 3,715,049 | * 2/1973 | McMullen et al. | 220/203.26 |
| 4,458,824 | * 7/1984 | Baaker et al. | 220/DIG. 33 |
| 4,498,493 | * 2/1985 | Harris | 220/203.26 |
| 4,498,599 | * 2/1985 | Avrea | 220/203.26 |
| 4,887,733 | * 12/1989 | Harris | 220/203.26 |
| 5,480,055 | * 1/1996 | Harris et al. | 220/203.26 |
| 5,794,806 | * 8/1998 | Harris et al. | 220/203.26 |
| 5,829,620 | * 11/1998 | Harris et al. | 220/203.26 |

* cited by examiner

Primary Examiner—Allan N. Shoap
Assistant Examiner—Niki M. Eloshway
(74) Attorney, Agent, or Firm—Frishauf, Holtz, Goodman, Langer & Chick, P.C.

(57) ABSTRACT

A pressure and/or vacuum relief valve (11) for fitting in a cap assembly (4) for an automotive tank filler neck (1), with a substantially cylindrical valve housing (12), in which a valve spindle (23) controlling a first valve gap (26, 27) is mounted axially movably, on which, if necessary, a sleeve (29) controlling a second valve gap (27, 30) is guided axially movably, wherein the valve spindle (23) passes through a central aperture (24) in the upper end and a central aperture (25) in the lower end of the valve housing (12) and is axially guided by those apertures (24, 25).

6 Claims, 1 Drawing Sheet

OVER/UNDERPRESSURE VALVE FOR A FILLER NECK CAP ASSEMBLY

Figure 1:
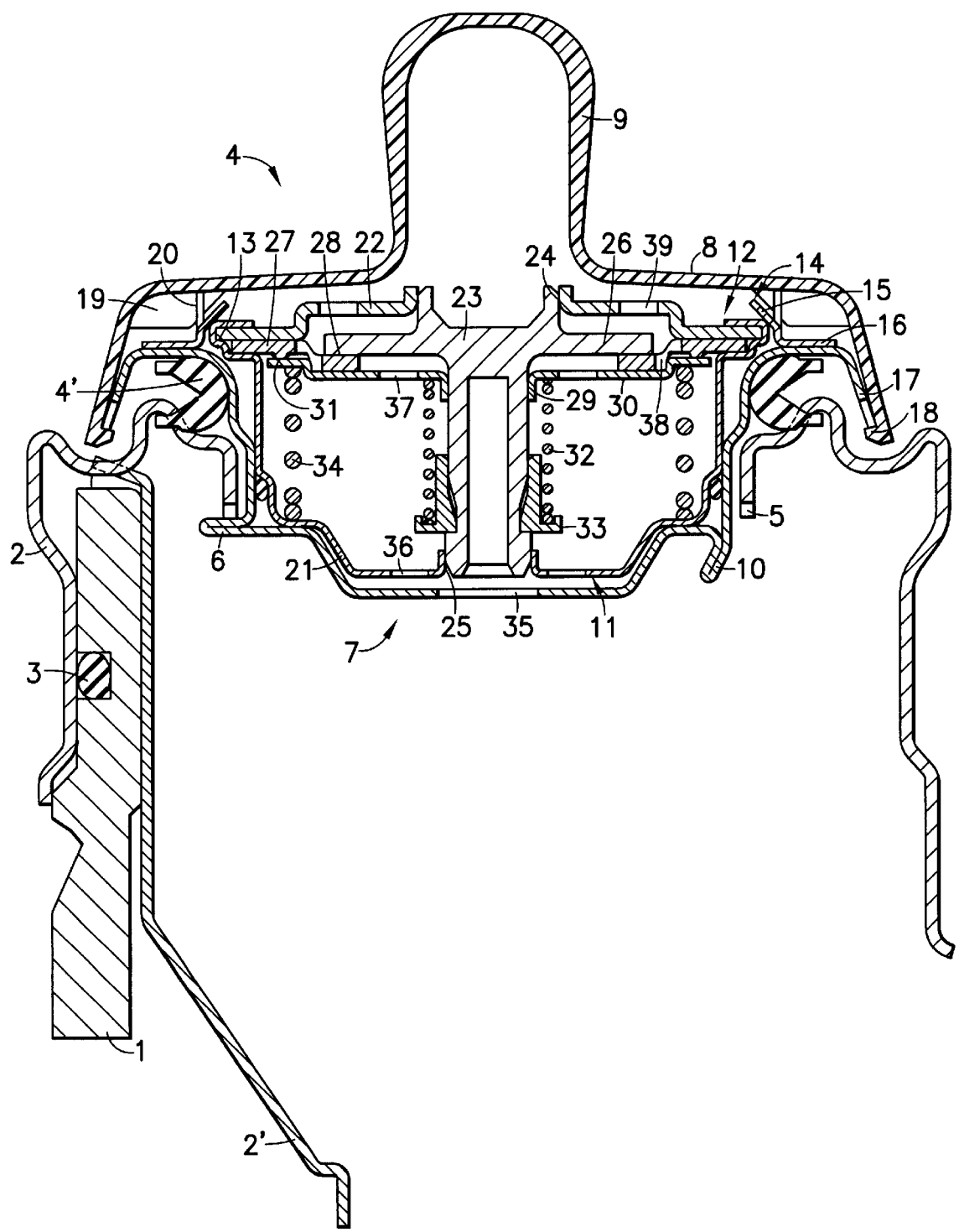

The present invention relates to a pressure and/or vacuum relief valve for fitting in a cap assembly for an automotive tank filler neck, with a substantially cylindrical valve housing, in which a valve spindle controlling a first valve gap is mounted axially movably, on which, if necessary, a sleeve controlling a second valve gap is guided axially movably.

In known pressure vacuum relief valves for fitting in tank cap assemblies, either no valve spindle whatsoever is included, or in other words the valve disk is pressed floatingly against the valve seat by a compression spring, or there is provided a valve spindle which is guided in the valve housing only at one end, or in other words is unsupported at the other end. In the first case, the valve seat can become defective. Even in the second case, problems with proper valve function have been observed in practice during continuous operation, although heretofore the causes thereof have not been recognized or closely investigated. Instead, it has been assumed that the valve seat deteriorates in the course of time.

The object of the invention is to provide a pressure and/or vacuum relief valve for fitting in a cap assembly for an automotive tank filler neck which retains its functional capability for a long period. This object is achieved according to the invention by the fact that the valve spindle passes through a central aperture in the upper end and a central aperture in the lower end of the valve housing and is axially guided by those apertures.

It is to the Applicant's credit that it was the first to have recognized that the defective valve function of the known designs is due to the fact that the severe shaking during vehicle operation eventually brings about "seizing" of the valve spindle in its bearing, if it is supported only at one end and projects without support at its other end. In contrast thereto, the valve spindle in the design according to the invention is axially guided at both ends, and so it remains completely mobile for a long period even in the presence of severe shaking.

In a preferred embodiment of the invention, the valve housing comprises an approximately pot-shaped container part of formed sheet metal and a substantially disk-shaped cover part of rigid material sealing this, the circumferential rim of which is embraced by the upper rim of the container part and together therewith forms the circumferential flange serving as means for anchoring in the cap assembly. This permits particularly inexpensive fabrication and at the same time provides a circumferential flange for anchoring the valve in the cap assembly.

Between container part and cover part there is preferably secured an annular sealing element, on which there bears, in a first annular region, a first valve disk carried by the valve spindle and, in a second, radially distinct annular region, a second valve disk carried by the sleeve. The use of a single annular sealing element for both the pressure relief valve and vacuum relief valve function in combination with the fastening means between the two valve housing parts permits further simplification of fabrication.

The invention will be explained in more detail hereinafter by means of an example illustrated in the attached drawing. The single figure of the drawing shows the pressure vacuum relief valve according to the invention, fitted in a cap assembly in combination with a filler neck, a section of which is illustrated, the left and right halves of the figure showing axial section halves disposed at right angles to each other.

In the figure there is shown the upper end 1 of a filler neck (not further illustrated), which leads to an automotive fuel tank. Onto the filler neck end 1 there is slipped a metal ring 2, an O-ring 3 being interposed therebetween. The metal ring 2 is used to anchor a cap assembly denoted as a whole by 4 and for this purpose is provided at its inside circumference with bayonet or helical slots 5 for engagement of corresponding projections 6 of the cap assembly 4. Between the cap assembly 4 and the metal ring 2 there is provided an annular profiled sealing element 4'. Between the metal ring 2 and the end face of the filler neck end 1 there is defined a guide funnel 2' to guide a fuel nozzle (not illustrated) for refuelling.

The cap assembly 4 comprises substantially a pot-shaped insert 7 formed from sheet metal, which carries the projections 6 and a top cap 8, formed from plastic, pushed onto the upper end of the insert 7 protruding from the filler neck end 1. The top cap 8 is equipped with a central hand grip 9. The projections 6 are obtained from a collar 10 depending downwardly from the circumference of the bottom of the insert 7.

In insert 7 there is contained the pressure vacuum relief valve according to the invention, which is denoted as a whole by 11. The pressure vacuum relief valve 11 is completely enclosed in a cylindrical valve housing 12, which is provided at its upper end with a circumferential flange 13, with which it is secured in the rebent rim 14 of the insert 7. Rebending of the rim 14 around the circumferential flange 13 can be achieved, for example, by beading or, as in the illustrated case, by inward bending of tongues 15, which are formed in a welded-on ring 16.

At the connection to the rebending region securing the circumferential flange 13, the rim 14 is prolonged and folded back outwardly at an obtuse angle of approximately 160° relative to the axial direction, thus producing a cuff 17 in the form of a truncated cone, onto which the top cap 8 can be snapped by means of inwardly directed snap-in locking projections 18. The top cap 8 is equipped with radial internal ribs 19, which engage in radial notches 20 in the ring 16 and transmit a torque applied on the top cap to the insert 7, in order to attach it to or detach it from the filler neck.

The valve housing 12 of the pressure vacuum relief valve 11 comprises a substantially pot-shaped container part 21 of formed sheet metal combined with a cover part 22 of rigid material, such as a metal plate with a thickness of 3 mm.

A valve spindle 23 is mounted axially movably in the valve housing 12. The valve spindle 23 passes through a central aperture 24 in the cover part 22 and a central aperture 25 in the bottom of the container part 21 and thus is guided axially at both of its ends by these two apertures.

The valve spindle 23 carries a first valve disk 26 (integrally formed thereon), which cooperates with an annular sealing element 27 in a first annular region 28. The annular sealing element 27 is secured between the cover part 22 and the container part 21. On the valve spindle 23 there is also guided axially movably a sleeve 29, which carries a second valve disk 30, which cooperates with the annular sealing element 27 in a second annular region 31. In the illustrated embodiment, the sleeve 29 is reduced to the axial length of a short collar, but it could also be substantially longer.

The first valve disk 26 is biased toward the annular sealing element 27 via a compression spring 32, which acts between a shouldered ring 33 fixed axially on the valve spindle 23 and the second valve disk 30. The second valve disk 30 is also biased toward the annular sealing element 27 by means of a compression spring 34, which is braced against the bottom of the container part 21.

Flow apertures 35 to 39, which are cut out of the insert 7, the container part 21, the second valve disk 30, the annular sealing element 27, the cover part 22 and the rim 16, provide either a flow path via the valve gap between the first valve disk 26 and annular sealing element 27 if pressure builds up in the interior of the filler neck 1, or a flow path via the valve gap between the second valve disk 30 and annular sealing element 27 if vacuum is produced in the interior of the filler neck 1. The functional principle of such a pressure vacuum relief valve is known in the art.

The invention is obviously not limited to the illustrated embodiment. For example, the pressure vacuum relief valve may have any known design or function and, for example, both valve disks can even bear concentrically on one side of the annular sealing element. It is also possible to provide only a pressure relief valve or only a vacuum relief valve function, in which cases the sleeve, the second valve disk and the second compression spring are omitted and the structure of the valve is simplified accordingly.

What is claimed is:

1. A pressure and/or vacuum relief valve for fitting in a cap assembly for an automotive tank filler neck, with a substantially cylindrical valve housing, in which a valve spindle controlling a first valve gap is mounted axially movably, wherein the valve spindle (23) is slidably engaged with an upper end and a lower end of the valve housing (12) and passes through a central aperture (24) in the upper end and a central aperture (25) in the lower end of the valve housing in order for said valve spindle to be axially guided by those apertures (24, 25).

2. A valve according to claim 1, wherein the valve housing (12) comprises an approximately pot-shaped contained part (21) of formed sheet metal having an upper rim (21), and a substantially disk-shaped cover part (22) of rigid material having a circumferential rim which is embraced by the upper rim of the container part (21) and which together therewith forms a circumferential flange (13) serving as means for anchoring in the cap assembly (4).

3. A valve according to claim 2, wherein between container part (21) and cover part (22) there is secured an annular sealing element (27), on which there bears, in a first annular region (28), a first valve disk (26) carried by the valve spindle (23) and, in a second, radially distinct annular region (31), a second valve disk (30) carried by the sleeve (29).

4. A valve according to claim 1, wherein the valve housing (12) comprises an approximately pot-shaped container part (21) and a disk-shaped cover part (22) for sealing the container part, and wherein between said container part (21) and said cover part (22) there is secured an annular sealing element (27), on which there bears, in a first annular region (28), a first valve disk (26) carried by the valve spindle (23) and, in a second, radially distinct annular region (31), a second valve disk (30) carried by the sleeve (29).

5. A valve according to claim 1, further comprising a sleeve on said valve spindle guided axially movably thereby, said sleeve controlling a second valve gap.

6. A pressure and/or vacuum relief valve for fitting in a cap assembly for an automotive tank filler neck, with a substantially cylindrical valve housing, in which a valve spindle controlling a first valve gap is mounted axially movably, wherein the valve spindle (23) is supported by an upper end and a lower end of the valve housing (12) and passes through a central aperture (24) in the upper end and a central aperture (25) in the lower end of the valve housing in order for said valve spindle to be axially guided by those apertures (24, 25).

* * * * *